Nov. 11, 1924.

A. P. GROHENS 1,515,386

BLANCHING MACHINE

Filed Aug. 30, 1923    4 Sheets-Sheet 2

Inventor:
Albert P. Grohens,
By Dyrenforth, Lee, Chritton, Wiles,
Attys.

Nov. 11, 1924.

A. P. GROHENS

BLANCHING MACHINE

Filed Aug. 30, 1923    4 Sheets-Sheet 3

1,515,386

Inventor:
Albert P. Grohens,
By Dynaforth, Lee, Chritton & Wiles,
Attys.

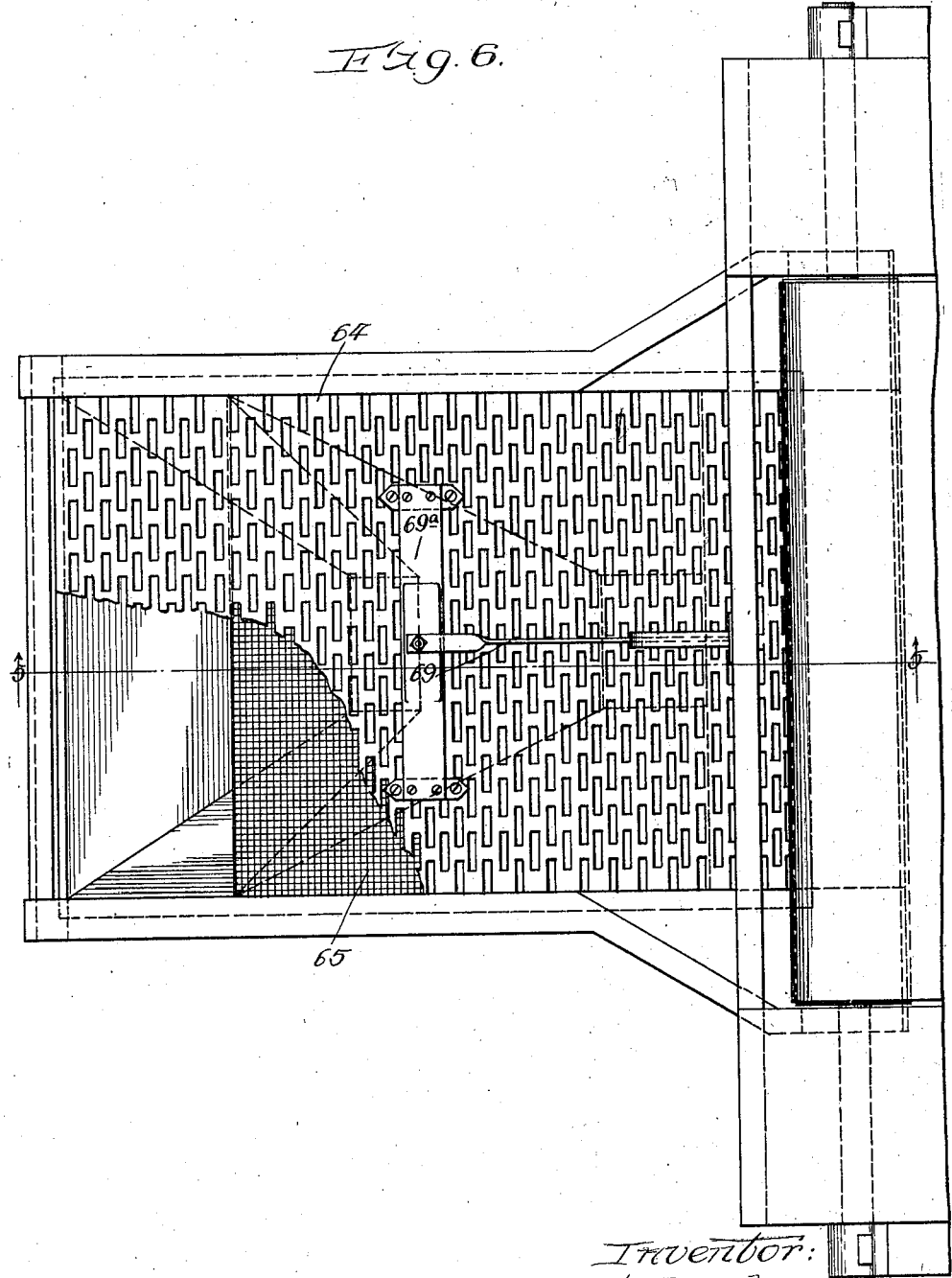

Patented Nov. 11, 1924.

1,515,386

UNITED STATES PATENT OFFICE.

ALBERT P. GROHENS, OF MARSHALL, MICHIGAN.

BLANCHING MACHINE.

Application filed August 30, 1923. Serial No. 660,152.

*To all whom it may concern:*

Be it known that I, ALBERT P. GROHENS, a citizen of the United States, residing at Marshall, in the county of Calhoun and State of Michigan, have invented a new and useful Improvement in Blanching Machines, of which the following is a specification.

This invention relates to improvements in blanching machines and, more especially, machines for blanching and removing the thin skins from nut meats of peanuts.

The invention will be fully understood by reference to the following specification and accompanying drawings, in which—

Figure 1:
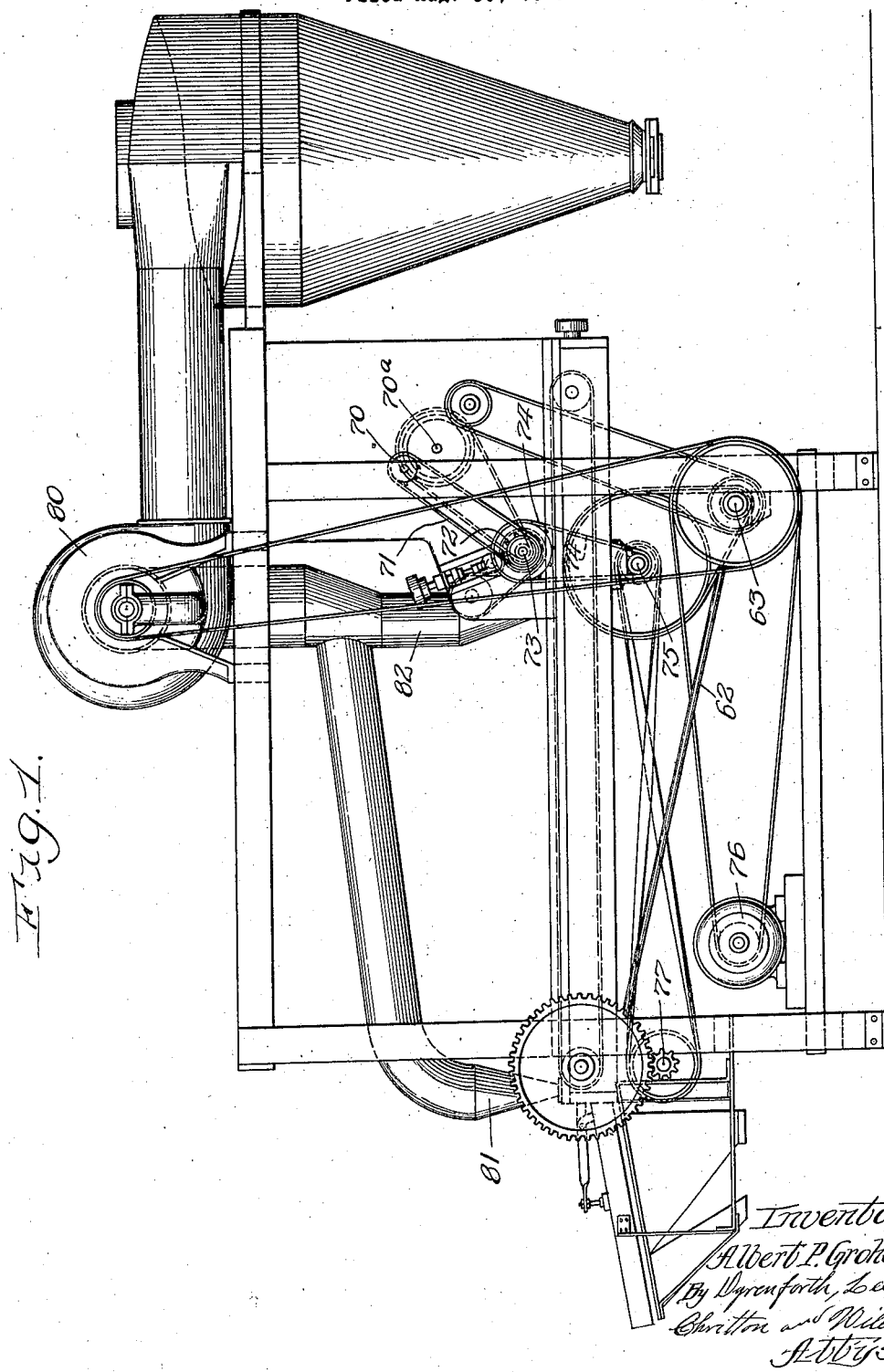
Figure 2:
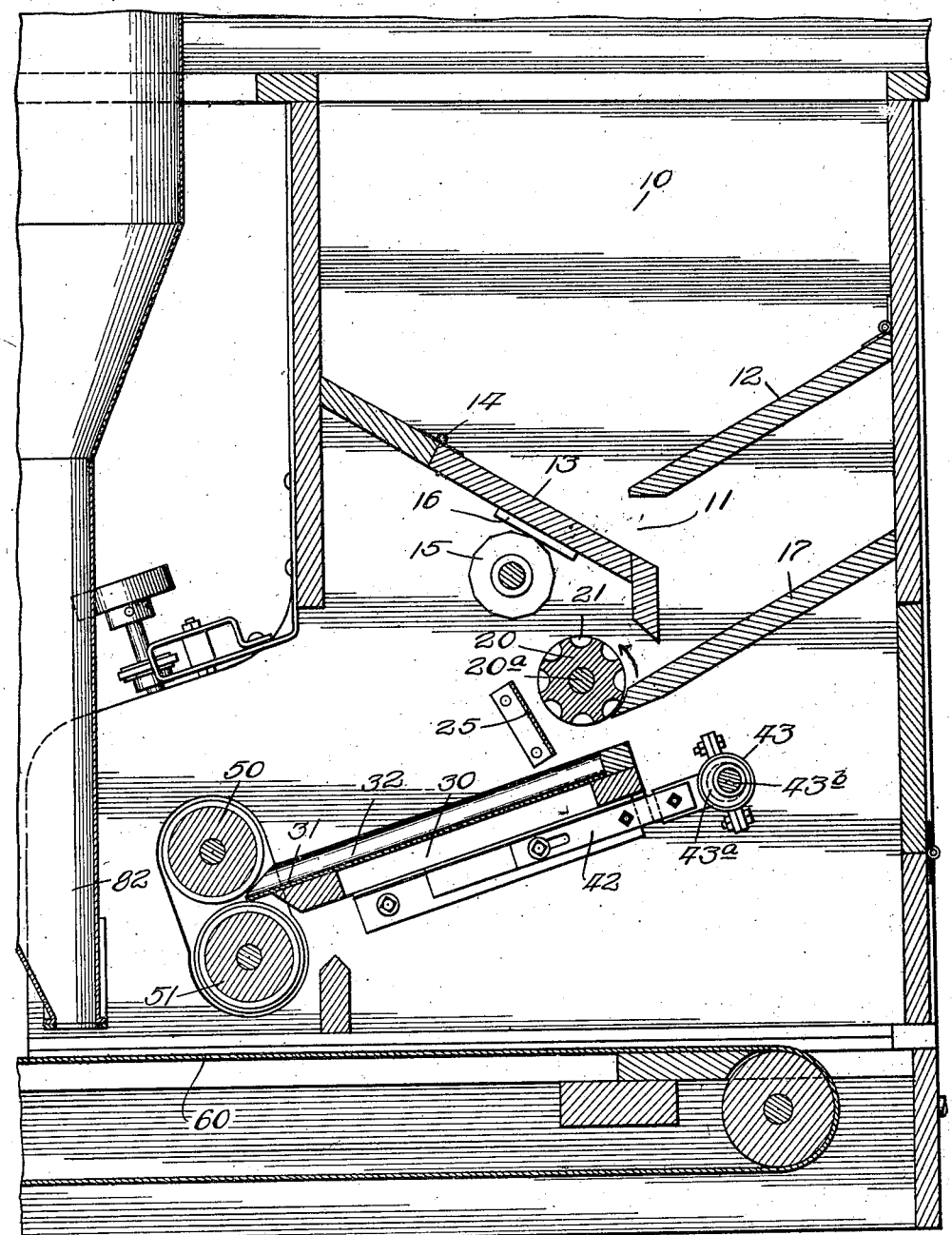
Figures 3, 4:
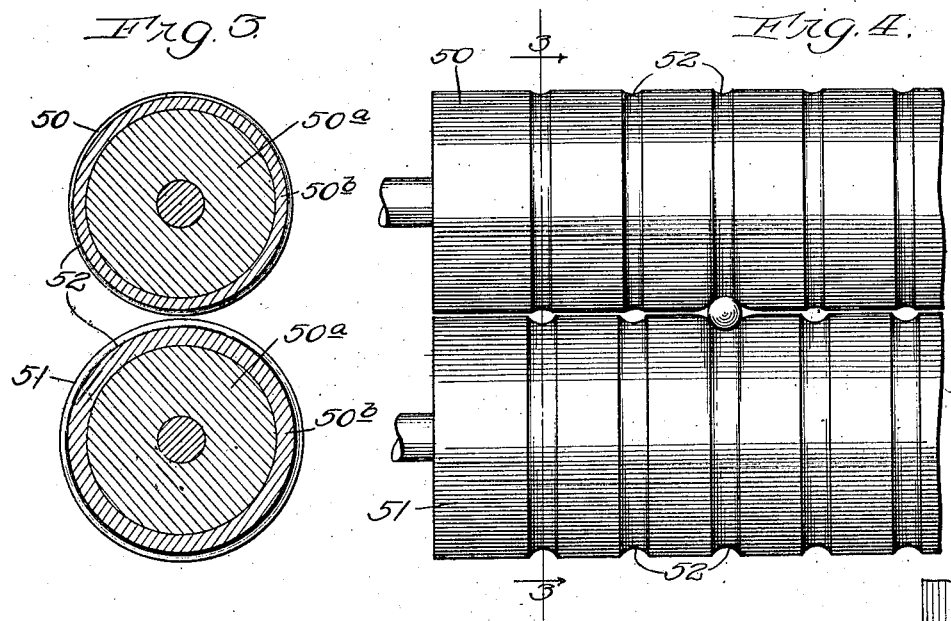
Figure 5:
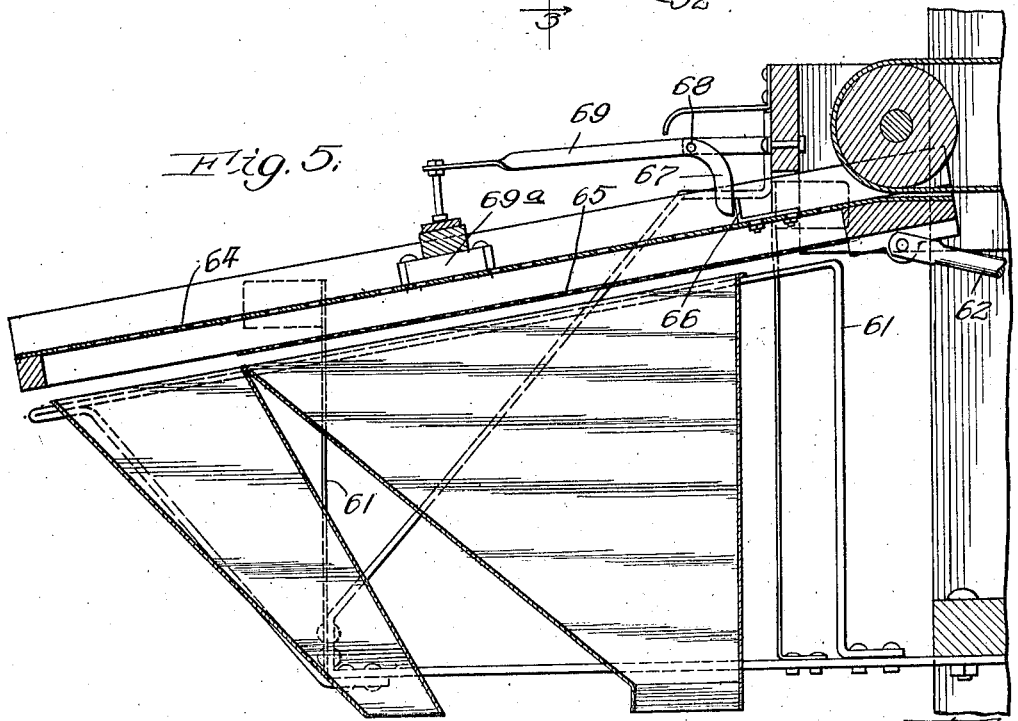

Figure 1 is a view in side elevation of a machine embodying the features of my invention, Figure 2 is a vertical, sectional view of the feeding mechanism and blanching rollers, Figure 3 is a vertical, sectional view taken through the blanching rollers, as indicated by the line 3 of Figure 4, Figure 4 is a plan view of one end of the blanching rollers showing their action on a nut meat, Figure 5 is a vertical, sectional vew of the screening mechanism or separator at the mouth of the machine, and Figure 6 is a plan view of the same.

As shown in the drawings, 10 indicates a hopper adapted to contain the nut meats to be blanched. The bottom of this hopper is provided with a slot 11, and the bottom of the hopper slants downwardly toward such a slot on each side thereof, as indicated by 12 and 13. The slanting side 13 is hinged at its upper edge, as indicated by 14, and its underside rests on the roller 15, which is substantially cylindrical, but has twelve slightly flattened faces. A flat sheet of metal 16, or other suitable material, is adapted to the bottom of the part 13 and interposed between such part and the roller 15. It will be seen by this construction, rotation of the roller 15 with its flattened sides will cause up and down movement of the lower free edge of the part 13, such movement being permitted by the hinges 14. The feeding of the nuts through the slot 11 is assisted by rotation of the roller 15 to cause a slight up and down movement of the board 13.

Arranged below the slot 11 is a slanting board 17 adapted to direct the nut meats issuing from the slot 11 to the feed roll 20, cylindrical in shape, and provided with eight longitudinally semi-circular grooves 21. The direction of rotation of the roller 20 is indicated by the arrow in Fig. 2. At one side of the roller 20, tangentially arranged with respect thereto, is a sheet of suitable material 25, lying close to the surface of the roller, as shown.

Below the roller 20 is arranged a board 30, having on its upper surface a flat sheet of metal 31, bent or corrugated to form the grooves 32. The board 30 is arranged at a slight slant, the edge under the roller 20 being slightly higher than the other edge. This board is slidably mounted, as shown, so it may reciprocate in the plane in which it lies. Attached to the board are two rods 42 carrying on their ends eccentric straps 43 operating on eccentric 43ª, mounted on a shaft 43ᵇ. Rotation of the shaft causes reciprocation of the board 30 with the result that nut meats falling into the grooves at the upper ends are caused to slide downwardly along such grooves by the reciprocating or shaking of the board.

At the lower ends of the grooves 32 are arranged two parallel blanching rollers 50 and 51, the former being higher than the latter, and slightly in advance thereof, as shown in Fig. 2. The roller 51 is substantially under the lower ends of the grooves 32. Each of the rollers 50 and 51 is provided with registering annular grooves 52 registering with the grooves 32. Each of the blanching rollers (see Fig. 3) has a core 50ª of soft spongy rubber, and a casing 50ᵇ of pure gum rubber. The grooves 52 are formed in the pure gum rubber.

Arranged below the rollers 50 and 51 is a suitable belt conveyor 60, or a similar device. The belt conveyor 60 is adapted to discharge material falling thereon onto a screening mechanism or separator arranged at the mouth of the machine. (See Figs. 5 and 6.)

This mechanism comprises a slanting screening table supported by four spring rods 61 and adapted to be reciprocated or shaken by a connecting rod 62 operated by an eccentric on a shaft 63, the spring rods 61 permit such reciprocating or shaking of the table. The table carries a perforated plate 64 with a screen 65 arranged below it. There is also provided on the table a stop or arm 66 adapted to engage the arm 67 which is pivoted at 68 and carries a longer arm 69, having mounted on its end a hammer 69ᵃ adapted to tap on the perforated plate 64. It is obvious that reciprocation of the member 66 engages the arm 67 to cause lifting and falling of the hammer 69ᵃ.

Suitable means for driving the various parts are provided as follows: The shaft supporting the roller 15 has a sprocket 70 on its end adapted to be driven by a chain 71. The chain 71 is driven by a sprocket 72 on the end of a shaft 73 which, in turn, is rotated by the chain 74 operated by the shaft 75. The shaft 75 is driven by means of a chain connection from the shaft 63 which, in turn, is driven by a belt from the motor 76. The shaft 73 also carries a chain connection to drive the shaft 20ᵃ which carries the roller 20. The shaft 63 also drives by means of a chain connection the shaft 43ᵇ which carries the eccentric 43ᵃ. The shaft 75 is also connected by a belt to drive the shaft 77 which acting through pinions drives the belt conveyors 60. The shaft 63 also drives by means of a belt connection, an exhaust fan 80 which is adapted to exhaust air from the nozzle 81 arranged adjacent the end of the belt conveyor, and also from the nozzle 82 arranged close to the discharge side of the rollers 50, 51.

In the operation of the device, the nut meats will be fed through the slot 11 by the movement of the board 13. From the slot 11, the nut meats will fall onto the board 17 and slide up against the roller 20 and into the grooves 21. Rotation of the roller 20 will carry the nut meats up over the roller and drop then down against the plate 25 and then into the grooves 32. Reciprocation of the board 30 and its slant, will cause the nut meats to slide along the lines in the grooves 32 and discharge from the ends thereof between the rollers 50, 51. It is to be noted that the fans and sprockets driving the rollers 50, 51 are so arranged that the speed of the roller 51 will be somewhat greater than that of the roller 50 so that there will be a slight sliding of their surfaces with respect to each other. The rollers 50, 51 are placed close enough together so that the nut meats falling between the rollers will be squeezed therebetween causing a slight compression of the material of which the rollers are made. The squeezing of the nut meats and the slipping motion of the rollers with respect to each other, caused by their different speeds, will cause a slight rubbing and rolling motion of the nut meats. This rolling and rubbing of the nut meats will loosen and remove the skins. The nut meats and loosened skins will fall on the conveyor 60 where they will be carried beneath the suction nozzle 82 which sucks up the lighter skins and leaves the nut meats to pass thereunder.

From the conveyor the nut meats fall onto the separator and screening mechanism. The perforated plate 64 has perforations for screening out the split or broken peanuts. The screen 65 underneath sorts out the hearts and small pieces.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a device of the character described, a pair of rollers each having a core of soft spongy rubber, and a casing of gum rubber, circumferential grooves in said rollers, means for driving the rollers in opposite directions at different speeds, and means for feeding nut meats between said rollers.

2. A means for removing the inner skin of a nut which adheres to the kernel, said means comprising a grooved roller made of elastic material in cooperation with a similar roller having a core of soft spongy material surrounded by an elastic casing having circumferential grooves.

3. A pair of blanching rollers rotated at different speeds, each roller having a soft spongy core surrounded by an elastic casing with circumferential grooves.

In witness whereof, I have hereunto set my hand and seal this 15th day of August, 1923.

ALBERT P. GROHENS. [L. S.]